(12) United States Patent
Boileau

(10) Patent No.: US 11,542,026 B2
(45) Date of Patent: Jan. 3, 2023

(54) AIRCRAFT PROPULSION UNIT AND METHOD FOR VENTILATING AN ENGINE ENCLOSURE

(71) Applicant: Safran Nacelles, Gonfreville L'Orcher (FR)

(72) Inventor: Patrick Boileau, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 225 days.

(21) Appl. No.: 16/907,944

(22) Filed: Jun. 22, 2020

(65) Prior Publication Data

US 2020/0317356 A1 Oct. 8, 2020

Related U.S. Application Data

(63) Continuation of application No. PCT/FR2018/053477, filed on Dec. 20, 2018.

(30) Foreign Application Priority Data

Dec. 21, 2017 (FR) ...................................... 1762822

(51) Int. Cl.
*B64D 29/06* (2006.01)
*F02C 7/14* (2006.01)
(Continued)

(52) U.S. Cl.
CPC ................ *B64D 29/06* (2013.01); *F02K 3/06* (2013.01); *F01D 25/24* (2013.01); *F02C 7/14* (2013.01);
(Continued)

(58) Field of Classification Search
CPC ... F02K 3/02; F02K 3/06; B64D 29/06; F05D 2220/323; F05D 2240/14; F05D 2260/213; F05D 2260/601; F05D 2260/608
See application file for complete search history.

(56) References Cited

U.S. PATENT DOCUMENTS 4,254,618 A * 3/1981 Elovic ..................... F02C 7/185
60/39.83
4,493,184 A * 1/1985 Nikkanen .............. B64D 33/08
60/39.83
(Continued)

FOREIGN PATENT DOCUMENTS

EP 1795708 A2 * 6/2007 ................ F02C 6/08
EP 2472067 7/2012
(Continued)

OTHER PUBLICATIONS

International Search Report for International Application PCT/FR2018/053477, dated Apr. 30, 2019.

*Primary Examiner* — Craig Kim
(74) *Attorney, Agent, or Firm* — Burris Law, PLLC

(57) ABSTRACT

A propulsion unit for an aircraft includes a nacelle, a turbojet engine, an annular flow path for circulating a secondary air flow, and a precooler device communicating with a motor enclosure and including a scoop opening into the annular flow path. The propulsion unit includes a compressed air supply circuit arranged in the propulsion unit for injecting a flow of compressed air into the scoop of the precooler device. A method for ventilating a motor enclosure of a propulsion unit includes injecting compressed air into a scoop of the precooler device when the turbojet engine is stopped.

11 Claims, 2 Drawing Sheets

(51) Int. Cl.
*F02C 7/18* (2006.01)
*F02K 3/06* (2006.01)
*F01D 25/24* (2006.01)

(52) U.S. Cl.
CPC .......... *F02C 7/18* (2013.01); *F05D 2220/323* (2013.01); *F05D 2240/14* (2013.01); *F05D 2260/213* (2013.01); *F05D 2260/601* (2013.01); *F05D 2260/608* (2013.01)

(56) References Cited

U.S. PATENT DOCUMENTS

| | | | | | |
|---|---|---|---|---|---|
| 5,123,242 | A | * | 6/1992 | Miller | F28F 27/02 60/39.83 |
| 5,127,222 | A | * | 7/1992 | Ream | B64D 29/00 60/39.83 |
| 5,269,135 | A | * | 12/1993 | Vermejan | F02C 7/04 60/266 |
| 5,357,742 | A | * | 10/1994 | Miller | F02C 7/18 60/39.83 |
| 5,729,969 | A | * | 3/1998 | Porte | F02C 7/185 60/782 |
| 8,192,147 | B2 | * | 6/2012 | Haas | B64D 33/02 415/144 |
| 8,250,852 | B2 | * | 8/2012 | Porte | F02K 3/115 60/785 |
| 8,875,518 | B2 | * | 11/2014 | Le Docte | B64D 29/06 60/226.3 |
| 9,151,224 | B2 | * | 10/2015 | Suciu | F02C 6/08 |
| 9,267,390 | B2 | * | 2/2016 | Lo | F02C 6/08 |
| 11,060,462 | B2 | * | 7/2021 | Fert | B64D 13/00 |
| 2008/0230651 | A1 | * | 9/2008 | Porte | F01D 9/065 60/785 |
| 2017/0342905 | A1 | * | 11/2017 | Pang | F02K 1/70 |
| 2021/0394917 | A1 | * | 12/2021 | Klovdahl | B64C 21/06 |
| 2022/0025834 | A1 | * | 1/2022 | Kirkbride | B64D 27/24 |

FOREIGN PATENT DOCUMENTS

| | | | | |
|---|---|---|---|---|
| EP | 3037647 A1 | * | 6/2016 | ............... F02C 6/08 |
| FR | 2896276 | | 7/2007 | |
| WO | WO-2012125895 A1 | * | 9/2012 | ............. B64D 13/08 |
| WO | 2014200587 | | 12/2014 | |
| WO | WO-2022018345 A1 | * | 1/2022 | |

\* cited by examiner

AIRCRAFT PROPULSION UNIT AND METHOD FOR VENTILATING AN ENGINE ENCLOSURE

CROSS-REFERENCE TO RELATED APPLICATIONS

This application is a continuation of International Application No. PCT/FR2018/053477, filed on Dec. 20, 2018, which claims priority to and the benefit of FR 17/62822 filed on Dec. 21, 2017. The disclosures of the above applications are incorporated herein by reference.

FIELD

The present disclosure relates to a propulsion unit for an aircraft and to a method for ventilating a motor enclosure of the propulsion unit.

BACKGROUND

The statements in this section merely provide background information related to the present disclosure and may not constitute prior art.

An aircraft is driven by several propulsion units each comprising a turbojet engine housed in a nacelle.

A propulsion unit comprises a nacelle, connected via a suspension mast also called an engine pylon, to the wing of the aircraft, and a turbojet engine, for example of the bypass type, adapted to generate, via the blades of the rotating fan, a flow of hot gases (also called primary flow) and a cold air flow (also called secondary flow) which circulates outside the turbojet engine, through an annular passage, also called flow path, formed between two concentric walls of the nacelle. The primary and secondary flows are ejected from the turbojet engine at the rear of the nacelle.

The nacelle generally has a tubular structure comprising an upstream section, or air inlet, located upstream of the turbojet engine, a middle section intended to surround the fan of the turbojet engine, a downstream section, intended to surround the combustion chamber of the turbojet engine (also called "core"), which can embed thrust reversal means, and can be terminated by an ejection nozzle located downstream of the turbojet engine.

The downstream section of the nacelle generally has an outer structure including an outer cowl, which defines, with a concentric inner fixed structure, the annular flow path for channeling the cold air flow. The inner fixed structure of the nacelle is generally designated by the acronym "IFS."

An annular passage, also called motor enclosure, is defined by the annular space comprised between the inner fixed structure of the nacelle and a motor casing surrounding the combustion chamber of the turbojet engine. Thermal blankets generally protect the inner fixed structure of the nacelle, exposed to hot gases circulating in the turbojet engine.

The propulsion unit includes several ventilation devices used to cool, when the propulsion unit is in operation, the motor enclosure. The ventilation of the motor enclosure can be ensured by ventilation vents, generally constituted by static or dynamic scoops distributed on the inner fixed structure of the nacelle. In addition, a precooler type heat exchanger, which is used to regulate the temperature that comes out of the air withdrawals intended for the aircraft ancillaries, discharges the air thereof when the circuit is open. This precooler operates in the following manner: a scoop withdraws the fresh air which circulates in the annular flow path, a valve controls the air flow rate, the fresh air is sucked by the precooler regulating the temperature of the air sent to the aircraft and is blown back into the motor enclosure, being mixed with the motor enclosure ventilation. All the hot air is ejected from the motor enclosure by the downstream of the propulsion unit.

When the turbojet engine goes from an operating state to a stopped state, no ventilation system operates. This results in an increase in temperature, which occurs, on the one hand, inside the combustion chamber of the turbojet engine, and, on the other hand, in the motor enclosure formed by the annular space comprised between the inner fixed structure of the nacelle and the motor casing surrounding the combustion chamber of the turbojet engine.

This increase in temperature is such that the turbojet engine and the motor enclosure are subjected to temperatures higher than the operating temperatures, the propulsion unit being no longer ventilated.

This increase in temperature can cause "coking" phenomena or deteriorations of structures or joints.

In order to prevent such phenomena or deteriorations from occurring, a first solution of the prior art consists in dimensioning the components of the combustion chamber of the turbojet engine so that they are compatible with the temperatures reached during the shutdown of the turbojet engine for 30 to 60 minutes.

The manufacturing cost of such components, which are oversized with respect to the thermal resistance, is relatively high.

A second solution of the prior art consists in continuing the ventilation by leaving the motor running dry. This solution is very restrictive and proves to be relatively expensive.

A third solution of the prior art is to increase the thickness of the thermal blankets which cover the inner fixed structure of the nacelle.

This solution is not satisfactory because it leads to an increase in the cost and the mass of the nacelle.

SUMMARY

This section provides a general summary of the disclosure and is not a comprehensive disclosure of its full scope or all of its features.

The present disclosure relates to a propulsion unit for an aircraft, including:
 a nacelle;
 a turbojet engine;
 an annular flow path for circulating a secondary air flow, defined between an outer structure of the nacelle and an inner fixed structure of the nacelle; and
 a precooler device, communicating with a motor enclosure defined by the annular space comprised between the inner fixed structure of the nacelle and a motor casing surrounding a combustion chamber of the turbojet engine, said precooler device including a scoop opening into said annular flow path and a valve for the intake of an air flow from said annular flow path,
 said propulsion unit being remarkable in that it includes a compressed air supply circuit, arranged in the propulsion unit and designed to inject a flow of compressed air into said scoop of the precooler device.

Thus, by providing a propulsion unit including a compressed air supply circuit arranged in the propulsion unit and designed to inject a flow of compressed air into the scoop of the precooler device opening into the annular flow path for circulating a secondary air flow, a Venturi effect is created in the annular flow path.

This generates a vacuum upstream of the precooler device, in the annular flow path. This vacuum causes a suction of the ambient outside air, causing a movement of air in the precooler device, which then sucks the hot air from the motor enclosure.

An air renewal is thus obtained in the motor enclosure, which allows inhibiting an increase in the temperature in this enclosure when the turbojet engine is stopped.

Oversizing the components of the combustion chamber of the turbojet engine is thus eliminated or reduced so that they withstand temperatures higher than operating temperatures, as is the case in the prior art. Moreover, it is no longer necessary to leave the turbojet engine run dry to allow this ventilation. The cost of manufacturing and operating such a propulsion unit is thus reduced relative to the prior art.

Finally, it is possible, thanks to the present disclosure to reduce, relative to the prior art, the thickness of the thermal blankets for protecting the inner fixed structure of the nacelle, which allows further reducing the cost of the propulsion unit, as well as its mass.

According to optional features of the propulsion unit of the present disclosure:

the compressed air supply circuit includes a jet injection manifold, integrated into said scoop and supplied by a pneumatic source;

the precooler device includes the intake valve downstream of the scoop, and the compressed air supply circuit includes a jet injection manifold, said injection manifold being integrated into said intake valve or between said scoop and said intake valve and being supplied by a pneumatic source;

the pneumatic source is integrated with the propulsion unit the pneumatic source may include a compressed air tank integrated with the propulsion unit;

the pneumatic source may include a compressor embedded in the propulsion unit;

alternatively, the pneumatic source is external to the propulsion unit.

The present disclosure also concerns a method for ventilating a motor enclosure of the propulsion unit, remarkable in that it includes a step of injecting compressed air into a scoop of the precooler device when the turbojet engine is stopped.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
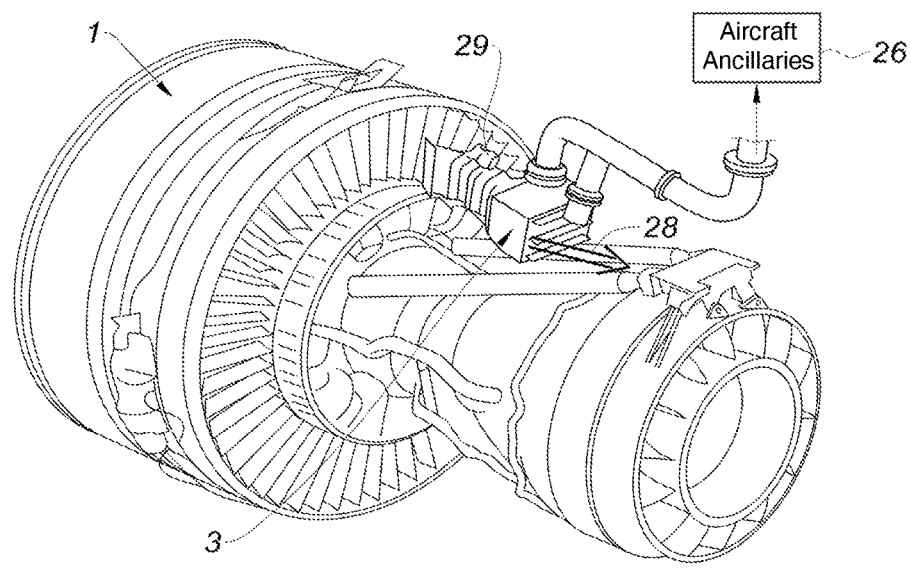
FIG. 1 is perspective view of a turbojet engine of a propulsion unit according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
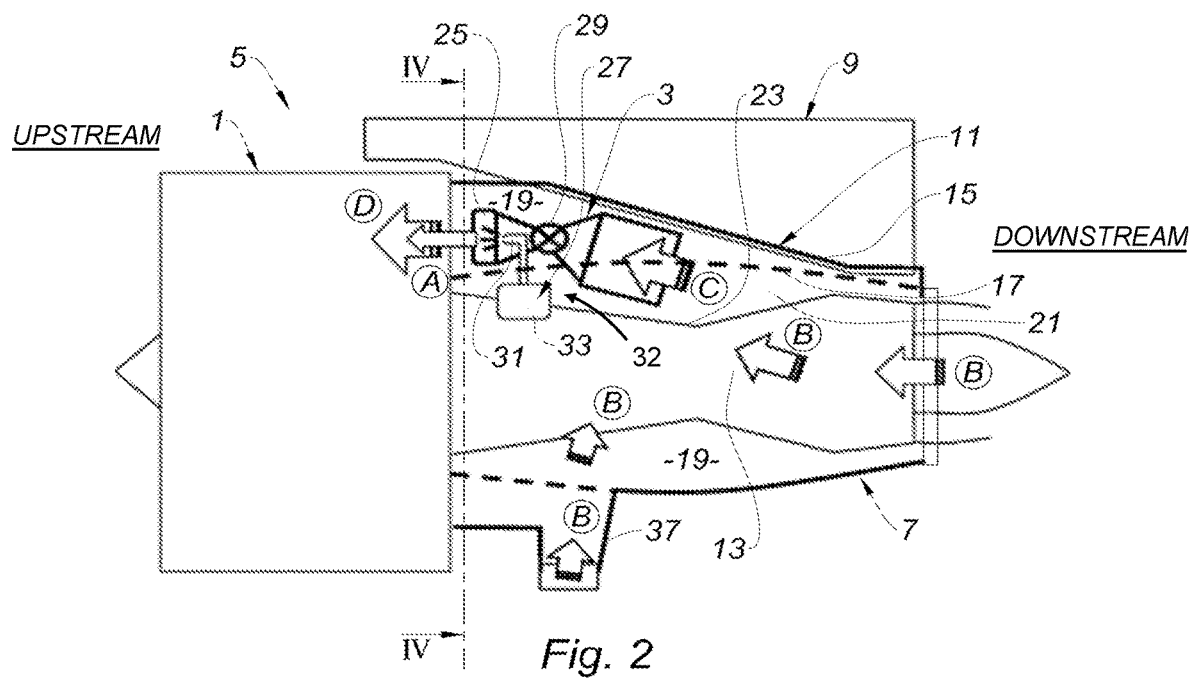
FIG. 2 is a longitudinal cross-sectional view of a propulsion unit according to a first form of the present disclosure.

In the description and in the claims, the terms "upstream" and "downstream" should be understood relative to the circulation of the air flow inside the propulsion unit formed by the nacelle and the turbojet engine, that is to say from left to right with reference to FIG. 2.

Similarly, the terms "inner" and "outer" will be used without limitation, with reference to the radial distance relative the longitudinal axis of the nacelle, the term "inner" defining an area which is radially closer to the longitudinal axis of the nacelle, as opposed to the term "outer."

Furthermore, in all figures, identical or similar references represent identical or similar members or sets of members.

Reference is made to FIG. 1, in which a turbojet engine 1 is represented, belonging to the propulsion unit of the present disclosure, and on which a precooler device 3 is mounted.

Reference is made to FIG. 2, illustrating the propulsion unit 5 of the present disclosure seen in longitudinal section, including a nacelle 7 surrounding the turbojet engine 1 and connected, via a suspension mast 9, to a wing (not represented) of the aircraft.

The nacelle 7 has a downstream section 11, intended to surround a combustion chamber 13 of the turbojet engine 1, having an outer structure 15 which defines, with a concentric inner fixed structure 17, the annular flow path 19 used to channel the secondary air flow of cold air.

A motor enclosure 21 is defined by the annular space comprised between the inner fixed structure 17 and a motor casing 23 surrounding the combustion chamber 13 of the turbojet engine 1.

Returning to FIG. 1, the precooler device 3 includes a scoop 25 opening into the annular flow path used in conventional operation of the precooler device to withdraw fresh air which circulates in the annular flow path, in order to cool the air of aircraft ancillaries 26 withdrawn from a high pressure compressor. This air from the annular flow path is discharged (arrow 28) into the motor enclosure 21. For this purpose, the precooler device 3 communicates with the motor enclosure 21.

According to the present disclosure, the propulsion unit 5 includes a compressed air supply circuit 27, shown in FIG. 2 to which reference is made again.

The compressed air supply circuit 27 is arranged in the propulsion unit to inject a flow of compressed air into the scoop 25 of the precooler device 3.

The precooler device includes an intake valve 29 for the intake of an air flow from the annular flow path. The propulsion unit may include a means for the automated actuation of the valve 29.

The compressed air supply circuit 27 includes a jet injection manifold 31, integrated into the scoop 25 of the precooler device 3 or into the intake valve 29 or between the scoop 25 and the intake valve 29.

The jet injection manifold 31 is supplied by a pneumatic source 32.

According to a first form of the propulsion unit of the present disclosure, the pneumatic source 32 is integrated with the propulsion unit 5. The pneumatic source 32 includes a compressed air tank 33 integrated into the propulsion unit, which can be charged from the outside of the propulsion unit via a supply tube connected to a tooling called "Ground Support Equipment," or from the inside of the propulsion unit, by the high pressure compressor of the turbojet engine 1. The pneumatic source 32 can also include a compressor embedded on the propulsion unit (not shown).

Figure 3:
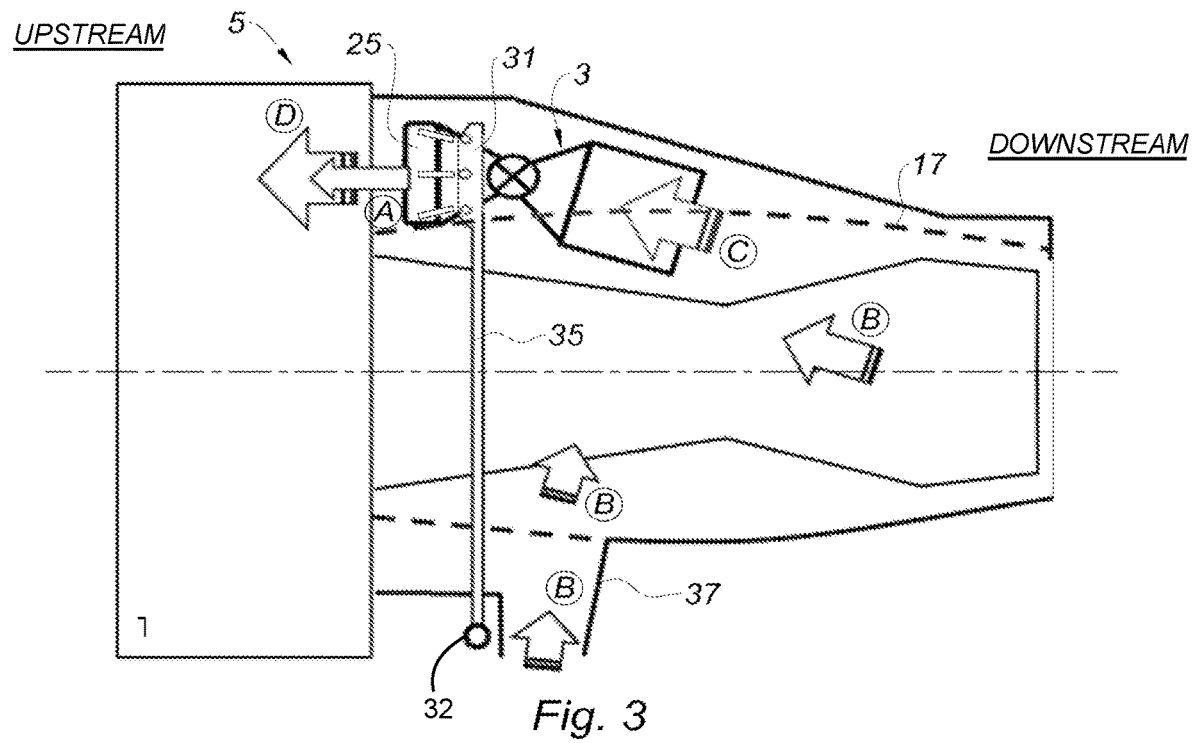
FIG. 3 is a longitudinal cross-sectional view of a propulsion unit according to a second form of the present disclosure.

According to a second form of the propulsion unit of the present disclosure, illustrated in FIG. 3, the pneumatic source 32 is external to the propulsion unit 5. The jet injection manifold 31 remains, in turn, integrated into the scoop 25 of the precooler device 3 and supplied by an external pneumatic source 32 via a conduit 35. The external pneumatic source 32 is connected to the motor tooling "Ground Support Equipment" or to a fixed compressed air circuit.

The operation of the present disclosure will now be described with reference to FIGS. 2 to 4.

When the turbojet engine 1 is stopped, the compressed air supply circuit 27 is supplied, via the pneumatic source 32 which can be integrated with the propulsion unit 5, or external to the propulsion unit 5.

The jet injection manifold 31, connected to the pneumatic source 32 and integrated into the scoop 25 of the precooler device 3, releases a flow of compressed air into the annular flow path 19 (step represented by the arrow A in FIGS. 2 and 3). Introducing the compressed air flow into the annular flow path 19, at rest, creates a Venturi effect in the annular flow path 19. This thus generates a vacuum upstream of the precooler device 3, in the annular flow path 19.

This vacuum causes a suction of the ambient outside air, downstream of the propulsion unit 5 or through ventilation vents 37 formed in the inner fixed structure 17 of the nacelle 7, as represented in FIGS. 2 and 3 by the arrows B.

Figure 4:
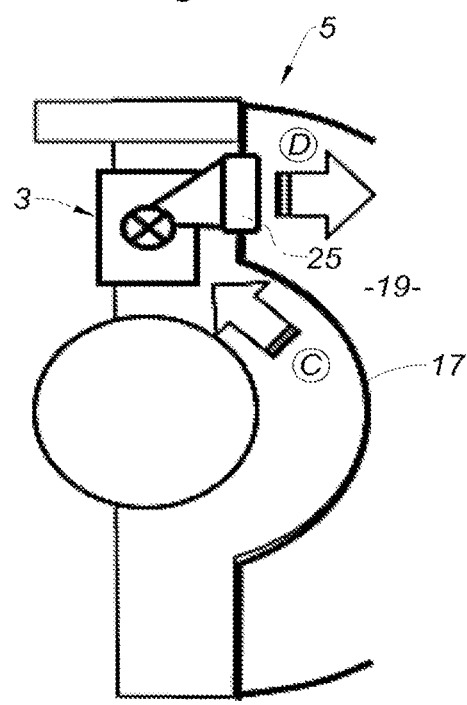
FIG. 4 is a cross-sectional view according to line IV-IV of FIG. 2.

This results in a movement of air in the precooler device 3, which then sucks the hot air from the motor enclosure 21, as represented in FIGS. 2 to 4 by the arrow C.

The precooler device 3 then rejects the hot air coming from the motor enclosure 21 through the scoop 25 of the precooler device 3, as represented by the arrow D in FIGS. 2 to 4.

An air renewal is thus obtained in the motor enclosure 21, which inhibits an increase in the temperature in this enclosure when the turbojet engine 1 is stopped.

Thus, according to the present disclosure, the method for ventilating the motor enclosure 21 of the propulsion unit 5 includes a step of injecting compressed air into a scoop 25 of the precooler device 3 when the turbojet engine 1 is stopped.

The precooler device 3 then operates in reverse mode when the turbojet engine 1 is stopped, relative to a conventional operation when the turbojet engine 1 is in operation.

Of course, the present disclosure is not limited to the examples of the propulsion unit described hereinabove, but it encompasses, on the contrary, all variants involving the technical equivalents of the described means as well as the combinations thereof if these fall within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A propulsion unit for an aircraft comprising:
   a nacelle;
   a turbojet engine;
   an annular flow path for circulating a secondary air flow, defined between an outer structure of the nacelle and an inner fixed structure of the nacelle;
   a precooler device in communication with a motor enclosure defined by an annular space between the inner fixed structure of the nacelle and a motor casing surrounding a combustion chamber of the turbojet engine, the precooler device including a scoop opening into the annular flow path and an intake valve; and
   a compressed air supply circuit arranged in the propulsion unit to inject a flow of compressed air into the scoop of the precooler device in an upstream direction to generate a vacuum upstream of the precooler device.

2. The propulsion unit according to claim 1, wherein the compressed air supply circuit includes a jet injection manifold integrated into the scoop and supplied by a pneumatic source.

3. The propulsion unit according to claim 2, wherein the pneumatic source is external to the propulsion unit.

4. The propulsion unit according to claim 1, wherein the intake valve of the precooler device is downstream of the scoop, and the compressed air supply circuit includes a jet injection manifold integrated into the intake valve, or between the scoop and the intake valve, and being supplied by a pneumatic source.

5. The propulsion unit according to claim 4, wherein the pneumatic source is integrated with the propulsion unit.

6. The propulsion unit according to claim 5, wherein the pneumatic source includes a compressed air tank integrated with the propulsion unit.

7. The propulsion unit according to claim 5, wherein the pneumatic source includes a compressor embedded on the propulsion unit.

8. The propulsion unit according to claim 4, wherein the pneumatic source is external to the propulsion unit.

9. A method for ventilating a motor enclosure of a propulsion unit according to claim 1, the method comprising injecting compressed air into the scoop of the precooler device when the turbojet engine is stopped.

10. A method for ventilating a motor enclosure of a propulsion unit for an aircraft comprising:
    a nacelle;
    a turbojet engine;
    an annular flow path for circulating a secondary air flow, defined between an outer structure of the nacelle and an inner fixed structure of the nacelle;
    a precooler device in communication with a motor enclosure defined by an annular space between the inner fixed structure of the nacelle and a motor casing surrounding a combustion chamber of the turbojet engine, the precooler device including a scoop opening into the annular flow path and an intake valve; and a compressed air supply circuit arranged in the propulsion unit to inject a flow of compressed air into the scoop of the precooler device, the method comprising injecting compressed air into the scoop of the precooler device when the turbojet engine is stopped.

11. A propulsion unit for an aircraft comprising:

a nacelle;

a turbojet engine;

an annular flow path for circulating a secondary air flow, defined between an outer structure of the nacelle and an inner fixed structure of the nacelle;

a precooler device in communication with a motor enclosure defined by an annular space between the inner fixed structure of the nacelle and a motor casing surrounding a combustion chamber of the turbojet engine, the precooler device including a scoop opening into the annular flow path and an intake valve; and a compressed air supply circuit arranged in the propulsion unit to inject a flow of compressed air into the scoop of the precooler device, wherein the compressed air supply circuit includes a jet injection manifold integrated into the scoop and supplied by a pneumatic source, wherein the pneumatic source is external to the propulsion unit.

* * * * *